United States Patent [19]

Carruth

[11] Patent Number: 4,863,673
[45] Date of Patent: Sep. 5, 1989

[54] CHECK VALVE TEST METHOD FOR CONTROL ROD DRIVE

[75] Inventor: John C. Carruth, San Jose, Calif.
[73] Assignee: General Electric Company, San Jose, Calif.
[21] Appl. No.: 236,830
[22] Filed: Aug. 26, 1988
[51] Int. Cl.$^4$ .................... G21C 17/00; G21C 7/16
[52] U.S. Cl. .................................... 376/230; 376/235; 376/245; 376/281
[58] Field of Search ............... 376/230, 231, 229, 235, 376/242, 245, 281

[56] References Cited

U.S. PATENT DOCUMENTS

| | | | |
|---|---|---|---|
| 3,020,887 | 2/1962 | Hobson et al. | 376/235 |
| 3,775,247 | 11/1973 | Ode et al. | 376/235 |
| 4,092,213 | 5/1978 | Nishimura | 376/235 |
| 4,489,036 | 12/1984 | Jamrus | 376/229 |

FOREIGN PATENT DOCUMENTS

| | | | |
|---|---|---|---|
| 1230140 | 12/1966 | Fed. Rep. of Germany | 376/230 |
| 2129392 | 12/1971 | Fed. Rep. of Germany | 376/230 |

*Primary Examiner*—Harvey E. Behrend
*Attorney, Agent, or Firm*—Robert R. Schroeder

[57] ABSTRACT

In a hydraulic system of a control rod drive for insertion of control rods, a test apparatus and test process is disclosed for determining the integrity of the hydraulic system check valve for preventing inadvertent control rod ejection responsive to the reactor pressure. The check valve is located between a hydraulic valve for causing rod insertion and the hydraulic cylinder. In this interval downstream of the check valve, alteration is made to the hydraulic path by the installation of a conduit with a quick disconnect connected through an isolation valve. Test apparatus for temporary connection at the disconnect is disclosed consisting of a small positive displacement piston and cylinder. The small positive displacement piston and cylinder connects to the quick disconnect through a complementary quick disconnect fitting and a rapidly opening toggle valve. Provision is made for timing the excursion of piston in the piston and cylinder preferably by end of stroke microswitches. A process for the testing of the integrity of the check valve is disclosed in which quick opening valve is opened with resultant backflow from the hydraulic system through the check valve into the volume defined by the small displacement. Presuming proper check valve operation and closure, the time of excursion of the piston between the two microswitches is long, indicating that the check valve seats and remains sealed to prevent control rod ejection. Alternately, if the time of excursion of the piston between the two microswitches is short, there is an indication that the check valve has not properly seated and that control rod ejection is possible. It is important to note that control rod ejection is not permitted due to the small volume of the interrogating piston and cylinder. Provision is made for the discharging of the contents of the piston back to the hydraulic circuit before removal of the test apparatus for sequential tests at adjacent control rod drives.

5 Claims, 1 Drawing Sheet

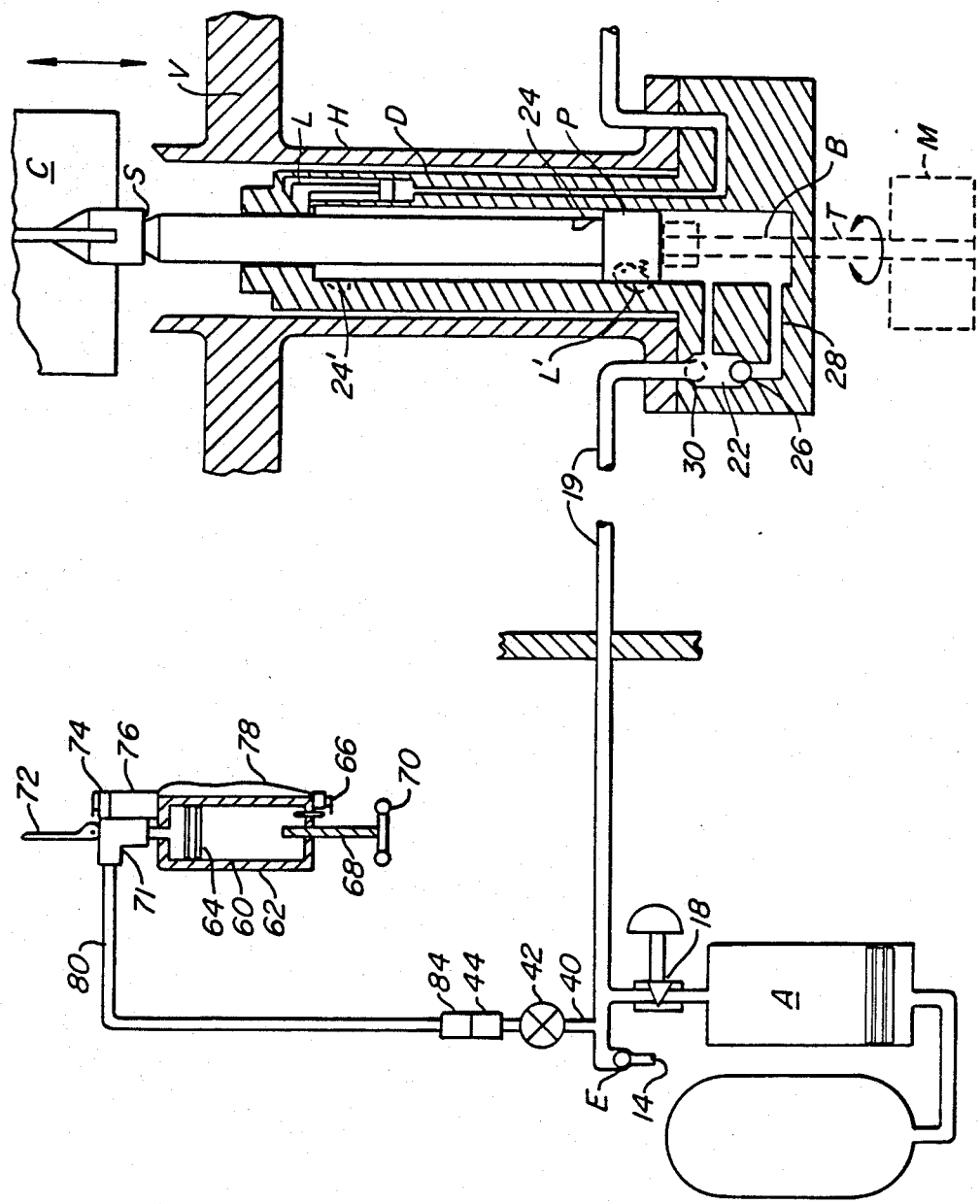
FIG._1.

CHECK VALVE TEST METHOD FOR CONTROL ROD DRIVE

BACKGROUND OF THE INVENTION

This invention relates to control rods and control rod drives in nuclear reactor, and more particular to the testing of check valves that prevent control rod ejection responsive to ambient reactor pressure.

STATEMENT OF THE PROBLEM

Control rods in nuclear reactors are inserted to the core of the reactor for control of the reactor reaction. Absent any other force, the ambient pressure interior of the reactor would cause control rod ejection.

Insertion of control rods usually occurs responsive to a fine movement system, either hydraulic or ball screw driven and a rapid movement system, which system is always hydraulic. In the case of a ball screw driven drive, slow and controlled movement of the control rod is responsive to rotation of a screw and change of a following screw ball in elevation for lifting the control rod to and from a control position of penetration within the reactor core.

In this ball screw control rod drive, the second system for control rod insertion is hydraulic. This system causes the piston on top of the ball screw drive to leave the position of normal support on the ball screw drive. The control rod rapidly moves upwardly responsive to hydraulic force from a position of withdrawal to a position of complete penetration of the reactor core for control of the reaction.

Some drives include hydraulics for both fine motion control and rapid insertion. Fine motion is achieved by a combination of controlled hydraulic power applied to the drive piston and a hydraulically controlled latch. SCRAM or rapid insertion occurs upon substantial hydraulic power being applied to the drive piston just as with the ball screw drive. It is sufficient to say that as long as the system is hydraulic, the disclosure herein is applicable.

Such hydraulic systems must be fail safe. These systems must be designed with safe guards against conceivable casualty scenarios. In order to understand the test apparatus and test process of this invention, it is required to understand the hypothesized casualties.

Hydraulic systems have been known to fail. In in a nuclear reactor, the high pressure hydraulic system for the immediate insertion of a control rod were to fail, other causalities could conceivably follow.

Control rod drives upon insertion are equipped with ratchet mechanisms. These mechanisms maintain the rods in their inserted position unless deliberate control rod withdrawal is undertaken. However, as a fail safe procedure, it is assumed for purposes of analysis that such systems do not work. In other words, the hydraulic system itself must be designed to prevent inadvertent control rod withdrawal.

Assuming failure of the hydraulic system, the control rod will be under an ejection force from the full pressure interior of the boiling water nuclear reactor.

In an attempt to guard against this scenario, a check valve has been placed in the drive at the inlet of the hydraulic system. Upon inadvertent rupture of the system, the check valve is designed to close, stopping further control rod ejection.

Unfortunately, the checking of the functionality of this ejection prevention check valve has heretofore not been practically possible because of its remote location in a hostile environment under the vessel without system disassembly and inspection.

One possibility for checking the ejection prevention valve has been to relieve the hydraulic pressure on the control rod insertion system to see if the check valve will seat without seepage to prevent control rod ejection. Unfortunately, in such a test, should the check valve be defective at least a partial ejection of the control rod would result. In such an ejection the very casualty that the system was designed to prevent could conceivably be precipitated.

Consequently, there remains a need to design a system for the inspection of the integrity of the control valve ejection prevention check valve. Such a test must not otherwise interfere with the safe operating state of the reactor.

SUMMARY OF THE INVENTION

In a hydraulic system of a control rod drive for insertion of control rods, a test apparatus and test process is disclosed for determining the integrity of the hydraulic system check valve for preventing inadvertent control rod ejection responsive to the reactor pressure. The check valve is located at the drive between a hydraulic valve for causing rod insertion and the drive hydraulic cylinder. In this interval downstream of the check valve, alteration is made to the hydraulic path by the installation of a conduit with a quick disconnect connected through an isolation valve. Test apparatus for temporary connection at the disconnect is disclosed consisting of a small positive displacement piston and cylinder. The small positive displacement piston and cylinder connects to the quick disconnect through a complementary quick disconnect fitting and a rapidly opening toggle valve. Provision is made for timing the excursion of piston in the piston and cylinder preferably by end of stroke microswitches. A process for the testing of the integrity of the check valve is disclosed in which quick opening valve is opened with resultant backflow from the hydraulic system through the check valve into the volume defined by the small displacement. Presuming proper check valve operation and closure, the time of excursion of the piston between the two microswitches is long, indicating that the check valve seats and remains sealed to prevent control rod ejection. Alternately, if the time of excursion of the piston between the two microswitches is short, there is an indication that the check valve has not properly seated and that control rod ejection is possible. It is important to note that control rod ejection is not permitted due to the small volume of the interrogating piston and cylinder. Provision is made for the discharging of the contents of the piston back to the hydraulic circuit before removal of the test apparatus for sequential tests at adjacent control rod drives.

OTHER OBJECTS, FEATURES AND ADVANTAGES

An object to this invention is to establish a test protocol for an ejection prevention check valve on the hydraulics of a control rod drive. Accordingly, a positive displacement piston and cylinder is utilized, the piston having a stroke of limited volume. Piston movement is timed from beginning of stroke to end of stroke over the small volume therebetween. The length of the piston stroke, preferably being beyond a predetermined test standard time, establishes check valve integrity. Simply stated, the volume of the piston and cylinder is sufficient to permit immediate check valve closure and testing of the seal of the check valve.

An advantage of this test apparatus and process is that it in no way interferes with the integrity of the hydraulic systems. For example, SCRAM of a drive can be undertaken even at a drive under test without interfering with the operation of the control rod drive in any fashion.

Yet another advantage of this procedure is that for the first time checking of the integrity of the check valve is permitted without perceptible ejection of the control rod.

Yet another advantage is that the disclosed test protocol is applicable to all types of control rod drives, including those drives which are completely hydraulic as well as those drives which are partially ball screw actuated and partially hydraulic actuated.

A further object to this invention is to set forth a test protocol that requires minimal modification of extant or future control rod drives for tests of their respective backflow check valves. According to this aspect of the invention, the drives are modified by the attachment of a conduit between the valve closing pressure source and the reverse flow check valve from the control rod drive hydraulics. This conduit is preferably provided with a quick disconnect fitting communicated through the isolation valve.

An advantage of this aspect of the invention is that with the above simple modification, all hydraulic drives are easily and expeditiously altered for the test apparatus and protocol of this invention.

A further object to this invention is to disclose a simplified apparatus for tests. According to this aspect, a positive displacement cylinder of small volume is provided. The cylinder is designed for communication to the hydraulic circuit being tested through a mating quick disconnect and a quick opening valve. Microswitches monitor the beginning of stroke and the end of stroke. By the expedient of timing the interval between microswitch actuation, a definitive test of the function of the ejection prevent check valve can be made.

An advantage of this aspect of the invention is the simplicity of the test apparatus.

Other objects, features and advantages of this invention will become more apparent after referring to the following specification and attached drawings in which:

FIG. 1 is a schematic of a control rod drive illustrating a hydraulic system for insertion of the control rod and showing the installation of a quick disconnect and isolation valve necessary for the test process and apparatus disclosed herein, it being understood that this diagram schematically discloses structure for either a ball screw control drive or an all hydraulic drive.

Referring to FIG. 1, a reactor vessel V is shown. A control rod drive housing H depends from the reactor vessel V and holds a control rod drive D. The drive includes at its upper end a coupling S. Coupling S has mounted there upon, a control rod C.

In order to understand the problem created by control rod ejection, it must be remembered that vessel V is a pressure vessel. In the case of a boiling water reactor, the pressure interior of vessel V can be 1,000 lbs. per square inch of pressure. In the absence of drive D and presuming that control rod C is fully inserted, it would be expected that the control rod C would be ejected by the pressure interior of the vessel V from the reactor.

As is common, the control rod C moves to and from a core U interior of the reactor between fuel bundles F for control of the reaction. As illustrated in FIG. 1, drive D can be of two discrete types.

First, drive D can be a hydraulic drive. In such hydraulic drives, incremental motion is achieved by applying controlled fluid inflow 14 through conduit 19 to piston P. Rapid insertion (SCRAM) is achieved by opening valve 18 and applying high pressure fluid from accumulator A through conduit 19 through a check valve 22. Check valve 22 is the valve whose integrity is to be tested by this invention.

After passing through check valve 22, fluid—typically water—acts upon a piston P interior of the control rod drive. When acting upon piston P, the control rod is advanced and retracted interior of the core C between the fuel bundles F.

During control rod insertion, it is common to latch the rod in the inserted position. Specifically, and in the embodiment here illustrated, a hydraulically actuated latch mechanism L is illustrated. Latch mechanism L acts upon the side of piston P at indentations 24. The control rod is thus maintained in its position of insertion.

As has been previously emphasized, it is assumed, for the casualty control scenarios, that if the latches L and their engagement at 24 fails for some reason, the check valve 22 is then the safety system under which the hydraulic system P operates.

Assuming a failure in the hydraulic system, high pressure will no longer be maintained at conduit 19. Ball 26 interior of check valve 22 will move from its lower seated position to an upper seated position blocking conduit 19. Such movement will occur as piston P drives fluid towards conduit 19 and in the case of the particular hydraulics herein illustrated, conduit 28 unseats ball 26 from its lower position to an upward seated position at 30.

It will also be understood that FIG. 1 can be just as well illustrative of a prior art ball screw assisted hydraulic drive. In such drives, a motor M turns a shaft T. Shaft T operates on a ball screw B. Ball screw B raises and lowers couplings S connected to the bottom of control rod C. (Inflow 14 is used only as a purge flow to minimize contamination of the drive). Such drives typically include again a piston such as piston P. Again SCRAM is achieved by the opening of valve 18, piston P moves rapidly upward. In such movement it unseats the piston from the ball screw B with the result that the control rod C is rapidly inserted. For this particular design the latch L' is on the piston and the notch 24' is on the stationary part of the drive D.

In either system, a failure of pressure at conduit 19 can cause piston P to reverse its path.

The basic SCRAM hydraulic circuit is essentially the same for both types of drives. A SCRAM valve (18) connects a high pressure accumulator (A) through the insert pipe (19) to the underside of the piston (P). The piston (P), fores the control rod (C) into the core. In the event of a failure of this long thin insert pipe (19), and the required assumption that the designed method of position retention also fails, reactor pressure will force the piston (P) out of the core unless the check valve (22) closes. Hence the need to test this check valve (22).

Since the check valve (22) is located in the drive, under the nuclear reactor, (in some cases in an inerted environment) the test must be run from a remote location (i.e., back near the accumulator (A)).

The two drives differ in the designed method of control rod position retention. The ball screw drive has two methods of position retention. The main method is resting on the ball nut, with an electromagnetic brake preventing rotation of the ball screw. Following SCRAM, when the piston leaves the ball nut, the secondary position retention method of a latch (L') takes effect. The latch is attached to the piston and latches into an indentation (24') in the stationary part of the drive. When the ball nut finally catches up to the piston, a boss on the piston nut unlatches the piston and the ball nut takes over in retaining the control rod position.

The hydraulic drive has only one method of position retention. It consists of a spring loaded, hydraulically operated latch (L) located on the stationary part of the drive. This latch engages indentations (24) located along the length of the piston (P). This same latch is used to retain the piston position following SCRAM.

The modification necessary for the utilization of the test apparatus of this invention can be easily understood. Typically, conduit 19 from between the exit to the check valve and the insert or SCRAM valve 18 is provided with conduit 40. Conduit 40 includes an isolation valve 42 and a quick disconnect 44. It is to the quick disconnect that connection occurs.

Having set forth the simple modification that changes the prior art drive shown in FIG. 1, attention may now be devoted to the test apparatus of this invention.

Referring to FIG. 1, SCRAM valve 18 is provided with a high pressure fluid source from accumulator A. The valve discharges through conduit 19 to the piston. Check valve 22 with ball 26 is in a position permitting the fluid flow from accumulated through conduit 19 to the piston.

Assuming that backflow occurs through conduit 19 responsive to control rod ejection, reverse flow will occur. Such flow will occur through the check valve 22 and out the now failed high pressure inlet 19.

Conduit 40 has been tapped to conduit 19. An isolation valve 42 is present, which isolation valve includes a quick disconnect 44.

The test apparatus includes a piston and cylinder 60, a hydraulic cylinder 62 has a free floating piston 64 placed therein. in the embodiment here shown, a microswitch 66 is placed at the bottom of stroke. As will hereinafter be more fully explained, a threaded rod 68 and handle 70 is utilized for returning piston 64 from end of stroke at microswitch 66 to the beginning of stroke at the opposite end of the cylinder 62 after each test.

A quick opening valve 71 is provided. This quick opening valve includes a quick opening toggle 72. Toggle 72 is moved at right angles to open the valve. When handle 72 opens valve 71, a microswitch 74 is actuated. Microswitch switch 74 starts a timer 76. Timer 76 continues to run until it receives a signal through conduit 78 from microswitch 66.

Quick opening toggle valve 72 is connected through a conduit 80 and a mating quick disconnect 84 to quick disconnect 44.

It will be understood that a reactor vessel V includes a multiplicity of hydraulic drives. Since a multiplicity of hydraulic drives is utilized, it will be understood that the simple test apparatus consisting of the quick opening valve 71 and the piston and cylinder 60 can be repetitively used one drive after another drive for the required test.

The test procedure is easily understood. Typically, connection is made at the quick disconnect across the mating fittings 44, 84. Thereafter, isolation valve 42 is opened communicating the high pressure circuit to the quick opening valve 71. At this juncture, piston 64 is at the end of the chamber remote from microswitch 66.

Quick opening toggle 72 is opened. This toggle triggers microswitch 74 to start timer 76. The timer commences to run.

At the same time, the volume of piston 64 can be seen to be small. This small volume begins to fill. As the volume begins to fill, fluid flow occurs from conduit 19 through the isolation valve 42, the quick opening valve 71 into the piston and cylinder 60.

Assuming safe operation of check valve 22, such reverse flow should cause check ball 26 to move from a lower position to the upper position 30. In upper position 30, flow from piston at conduit 19 should be stopped. This piston, assuming an operable check valve 22, should occur before the full stroke of piston 64 to microswitch 66.

It will be understood that if check 22 is not given proper seating or when seated lacks a complete seal, piston 64 will rapidly traverse cylinder 62. It will impact microswitch 66 stopping timer 76 in a short interval.

By knowing the volume of the piston stroke of piston 64 interior of cylinder 62, a standard can rapidly be set for check valve 22 to pass.

Returning briefly to FIG. 1, it will be realized that the volume interior of piston and cylinder 60 is extremely small when compared to the fluid volume required to be displaced by piston P for complete ejection of control rod C. This being the case, it will be understood that the test here disclosed does not require appreciable ejection of the control rod C to test the integrity of the check valve 22.

I claim:

1. In a hydraulically actuated control rod drive of the type including:
    a reactor vessel having a pressurized interior;
    a core in said reactor vessel containing fissionable materials;
    a control rod for movement into and out of said core for the control of fission in said fissionable material of said nuclear reactor, said control rod moveable against ambient pressure interior of said reactor;
    a hydraulic fluid pressure source;
    means for moving said control rod into and out of said core in said nuclear reactor, said means including a hydraulic actuator for urging said control rod into insertion within said core of said reactor, said hydraulic actuator communicated to said hydraulic fluid pressure source through a hydraulic circuit;
    a check valve in said hydraulic circuit between said hydraulic actuator and said hydraulic fluid pressure source for preventing reverse flow of said hydraulic circuit responsive to the ejection of said control rod by ambient pressure within said reactor vessel, the improvement to said hydraulic circuit comprising a hydraulic conduit between said check valve and said hydraulic fluid pressure source;
    an isolation valve for isolating said conduit;
    a positive displacement piston and cylinder having a beginning piston stroke and an ending position stroke with a known positive displacement of fluid between said beginning and ending stroke position corresponding to insignificant ejection of said control rod from said reactor vessel;

means for timing movement of said piston between said respective stroke positions for determining the rate of displacement of hydraulic fluid through said check valve; and means for connecting said piston through said isolation valve to said check valve whereby fluid passing through said check valve causes movement of said piston to indicate closure and integrity of said check valve without appreciable control rod ejection from said reactor.

2. The invention of claim 1 and including a first and second microswitch;

means for actuating said first microswitch upon admitting fluid to said piston and cylinder;

means for actuating said second microswitch upon end of stroke of said piston within said piston and cylinder.

3. The invention of claim 2 and wherein a timer is started by said first microswitch and stopped by said second microswitch.

4. The invention of claim 1 and including a quick disconnect between said positive displacement piston and said isolation valve for isolating said conduit.

5. A process for testing a check valve in a control rod drive in a nuclear reactor wherein a reactor vessel contains a core in a pressurized fluid environment and a control rod movable by a hydraulic piston by force through and from a hydraulic circuit into and out of the pressurized environment of said reactor vessel against the pressure of said pressurized environment, said hydraulic circuit including a fluid pressure source for insertion of said control rod and a conduit from said fluid pressure source to said hydraulic piston for inserting of said control rod and a check valve in said conduit between said pressure source and actuator for preventing reactor pressure ejection of said control rod from said reactor, the process for testing of the operation and integrity of said check valve comprising the steps of:

providing a connected test conduit between said check valve and said fluid pressure source for enabling said check valve to seat upon flow through said conduit;

providing a constant displacement hydraulic piston and cylinder, said piston having a stroke excursion within said cylinder for providing positive and known displacement, said displacement of said piston and cylinder corresponding to minimal ejection of said control rod from said core of said reactor;

connecting said piston to said test conduit;

permitting flow through said test conduit to said piston;

timing the stroke of said piston in said piston cylinder whereby the integrity of said check valve is indicated as a function of the stroke of said piston with respect to time with short stroke indicating lack of check valve integrity and long stroke indicating check valve seating and sealing.

* * * * *